United States Patent
Nammi et al.

(10) Patent No.: US 9,345,003 B2
(45) Date of Patent: May 17, 2016

(54) NETWORK NODE, A WIRELESS TERMINAL AND METHODS FOR CANCELLING INTERFERENCE

(71) Applicant: TELEFONAKTIEBOLAGET L M ERICSSON (PUBL), Stockholm (SE)

(72) Inventors: Sairamesh Nammi, Stockholm (SE); Johan Bergman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 179 days.

(21) Appl. No.: 14/238,603

(22) PCT Filed: Oct. 2, 2013

(86) PCT No.: PCT/SE2013/051154
§ 371 (c)(1),
(2) Date: Feb. 12, 2014

(87) PCT Pub. No.: WO2014/120059
PCT Pub. Date: Aug. 7, 2014

(65) Prior Publication Data
US 2015/0071188 A1    Mar. 12, 2015

Related U.S. Application Data

(60) Provisional application No. 61/758,656, filed on Jan. 30, 2013.

(51) Int. Cl.
| H04W 72/04 | (2009.01) |
| H04J 11/00 | (2006.01) |
| H04B 1/12  | (2006.01) |

(52) U.S. Cl.
CPC ............. *H04W 72/0406* (2013.01); *H04B 1/12* (2013.01); *H04J 11/005* (2013.01)

(58) Field of Classification Search
CPC . H04W 36/0005; H04W 40/00; H04W 40/04; H04W 40/12; H04W 72/00; H04W 72/02; H04W 72/04; H04W 72/0406; H04W 72/042; H04W 72/082; H04W 72/085; H04W 72/1205; H04B 1/12; H04J 11/005
See application file for complete search history.

(56) References Cited

U.S. PATENT DOCUMENTS

| 2010/0255852 A1* | 10/2010 | Chen ................... H04W 72/082 455/450 |
| 2012/0033646 A1 | 2/2012 | Luo et al. |

(Continued)

FOREIGN PATENT DOCUMENTS

| WO | 2013176606 A2 | 11/2013 |
| WO | 2014112914 A1 | 7/2014 |

OTHER PUBLICATIONS

Huawei et al. "Proposed SID: Study on UMTS Heterogeneous Networks" 3GPP TSG RAN Meeting #57, RP-121436, 2012, 5 pages.

(Continued)

*Primary Examiner* — Anh Ngoc Nguyen
(74) *Attorney, Agent, or Firm* — Rothwell, Figg, Ernst & Manbeck, P.C.

(57) ABSTRACT

A method in a network node for assisting a first wireless terminal in cancelling an interfering signal from a received signal in a wireless communication network. The first wireless terminal is located in a first coverage area of a first base station. The interfering signal originates from a second base station and is intended for a second wireless terminal located in a second coverage area of the second base station in the wireless communication network. The network node provides (601) the first wireless terminal with a configuration information related to a common control channel associated with the second base station. The network node further assists (602) the first wireless terminal in cancelling the interfering signal by providing information to the first wireless terminal about one or more of: a scheduling of the interfering signal and an identity of the second wireless terminal. The information is provided through an order related to said common control channel.

34 Claims, 9 Drawing Sheets

(56) References Cited

U.S. PATENT DOCUMENTS

| | | | |
|---|---|---|---|
| 2012/0082022 A1* | 4/2012 | Damnjanovic | H04J 11/005 370/201 |
| 2013/0005269 A1 | 1/2013 | Lindoff et al. | |
| 2013/0196701 A1* | 8/2013 | Tiirola | H04J 11/0026 455/501 |
| 2013/0272261 A1 | 10/2013 | Seo et al. | |

OTHER PUBLICATIONS

Ericsson et al. "Initial considerations on Heterogeneous Networks for UMTS" 3GPP TSG RAN WG1 Meeting #70bis, R1-124512, 2012, 7 pages.

Ericsson et al. "Heterogeneous Network Deployment Scenarios" 3GPP TSG-RAN WG1 #70bis, R1-124513, 2012, 3 pages.

Ericsson et al. "Simulation Assumptions for Evaluating Heterogeneous Network" 3GPP TSG-RAN WG1 #70bis, R1-124514, 2012, 5 pages.

Ericsson "Heterogeneous Network Deployment Scenarios" 3GPP TSG-RAN WG1 #70bis, 2012, R1-124513, 3 pages.

Ericsson "Simulation Assumptions for Evaluating Heterogeneous Networks" 3GPP TSG-RAN WG1 #70bis, 2012, R1-124514, 5 pages.

Huawei "Proposed SID: Study on UMTS Heterogeneous Networks" TSG-RAN Meeting #57, 2012, RP-121436, 5 pages.

* cited by examiner

NETWORK NODE, A WIRELESS TERMINAL AND METHODS FOR CANCELLING INTERFERENCE

CROSS REFERENCE TO RELATED APPLICATION(S)

This application is a 35 U.S.C. §371 National Phase Entry Application from PCT/SE2013/051154, filed Oct. 2, 2013, designating the United States, and also claims the benefit of U.S. Provisional Application No. 61/758,656, filed Jan. 30, 2013. The disclosures of both applications are incorporated herein in their entirety by reference.

TECHNICAL FIELD

The subject matter described herein generally relates to wireless communication networks. Embodiments herein relate to a network node, a wireless terminal and methods therein for cancelling an interfering signal from a received signal in wireless systems using orders related to common control channels such as common HS-SCCH orders.

BACKGROUND

Wireless terminals are enabled to communicate wirelessly in a radio communications system, sometimes also referred to as a radio communications network, a mobile communication system, a wireless communications network, a wireless communication system, a cellular radio system or a cellular system. The communication may be performed via a radio channel, e.g. between two wireless terminals, between a wireless terminal and a regular telephone and/or between a wireless terminal and a server via a Radio Access Network (RAN) and possibly one or more core networks, comprised within the wireless communications network.

A wireless terminal, sometimes referred to as a user terminal or a User Equipment (UE), is a mobile terminal by which a subscriber can access services offered by an operator's core network.

A cellular radio system covers a geographical area which is divided into cell areas, wherein each cell area is served by a network node such as a base station. In 3rd Generation Partnership Project (3GPP) Long Term Evolution (LTE), base stations may be referred to as eNodeBs or eNBs. A cell is the geographical area where radio coverage is provided by the base station at a base station site.

One base station, situated on the base station site, may serve one or several cells. Further, each base station may support one or several communication technologies. The base stations communicate over the air interface operating on radio frequencies with the user equipments within range of the base stations.

The base stations may be of different classes such as e.g. macro base stations, macro eNodeBs, home eNodeBs or pico base stations, based on transmission power and thereby also cell size.

During the past few years, wireless operators have offered mobile broadband services based on Wideband Code Division Multiple Access/High Speed Packet Access (WCDMA/HSPA). End user performance requirements have also increased, fuelled by new devices designed for data applications. The large uptake of mobile broadband has resulted in heavy traffic volumes that need to be handled by the HSPA networks, which have grown significantly. Therefore, techniques that allow operators to manage their spectrum resources more efficiently are of great importance.

It is possible to improve the downlink performance by introducing support for techniques such as 4 branch Multiple Input Multiple Output (MIMO), multiflow communication, multi carrier deployment, etc. Improvements in spectral efficiency per link are approaching theoretical limits. As a result, the next generation technology tends to focus on improving the spectral efficiency per unit area. Additional features for High Speed Downlink Packet Access (HSDPA) should then provide a uniform user experience to users anywhere inside a cell by changing the topology of traditional networks. Currently 3GPP has been working on this aspect using heterogeneous networks.

A homogeneous network is a network of base stations, e.g. Node Bs, in a planned layout and a collection of wireless terminals. In the homogeneous network all base stations have similar transmit power levels, antenna patterns, receiver noise floors, and similar backhaul connectivity to the data network. Moreover, all base stations offer unrestricted access to wireless terminals in the network, and serve roughly the same number of wireless terminals. Current wireless systems that come under this category include Global System for Mobile communications (GSM), WCDMA, HSDPA, LTE, and Worldwide Interoperability for Microwave Access (WiMax).

In a heterogeneous network (HetNet), in addition to the planned or regular placement of macro base stations, several pico and/or femto and/or relay base stations are deployed as illustrated in FIG. 1a. The power transmitted by these pico and/or femto and/or relay base stations, being up to 2 W, is relatively small compared to that of the macro base stations, up to 40 W. These Low Power Nodes (LPN) are typically deployed to eliminate coverage holes in the homogeneous network using macro base stations only. The LPNs may improve capacity in hot-spots. Due to their low transmit power and small physical size, the pico/femto/relay base stations may offer flexible site acquisitions.

Heterogeneous networks may be divided into two deployment categories: co-channel deployment and soft cell deployment. The latter is also referred to as shared or combined cell deployment. In the co-channel deployment, an LPN has a cell identifier different from that of the macro node, i.e. the LPNs create different cells. In the soft cell deployment, each LPN has a cell identifier which is the same as that of the macro node.

FIG. 1b illustrates an example of a heterogeneous network where the low power nodes create different cells, which is an example of the co-channel deployment. Simulations indicate that significant gains in the system throughput as well as cell edge user throughput may be realized through the co-channel deployment. One reason for the improved throughput is that the co-channel deployment provides opportunities for load balancing. In a heavy data traffic scenario, the load in the macro cell may be shared between the macro node and the low power nodes. Also, users with low Signal-to-Noise-Ratio (SINR) may be served by strategically located LPNs. In short, the LPNs may provide resources to serve users and thereby increase average user throughput of the network.

However, since each LPN creates a different cell, one disadvantage of the co-channel deployment is that a soft handover is necessary when a wireless terminal moves from one LPN to the macro node or to another LPN. As a result, a higher layer, e.g. above physical layer, signaling is necessary to perform the handover.

FIG. 1c illustrates a heterogeneous network with a combined cell deployment. As indicated, the LPNs are part of the macro cell in this deployment. As such, the combined cell deployment may avoid the frequent soft handovers, and hence, may avoid the higher layer signaling.

In a combined cell deployment, all the nodes may be coupled to a central node, e.g. to the macro node, via high speed data link as shown in FIG. 1d. In the figure, the controlling central node in the combined cell may take responsibility for collecting operational statistics information of network environment measurements. The decision of which nodes to transmit to a specific wireless terminal may be made by the controlling central node based on the information provided by the wireless terminal. The cooperation among various nodes is instructed by the controlling central node and implemented in a centralized way.

Even though huge gains in terms of average sector throughput may be achieved with the introduction of LPNs, the interference structure becomes more complex in heterogeneous networks. For example, when a UE, such as a wireless terminal, is connected to an LPN, individual UE link throughput may be impacted due to the interference of the macro node power.

SUMMARY

An object of embodiments herein is to provide a way of improving the performance of a wireless communication network.

According to a first aspect of embodiments herein, the object is achieved by a method in a network node for assisting a first wireless terminal in cancelling an interfering signal from a received signal in a wireless communication network. The first wireless terminal is located in a first coverage area of a first base station. The interfering signal originates from a second base station. Further, the interfering signal is intended for a second wireless terminal located in a second coverage area of the second base station in the wireless communication network. The network node provides the first wireless terminal with a configuration information related to a common control channel. The common control channel is associated with the second base station, from which the interfering signal originates. The network node further assists the first wireless terminal in cancelling the interfering signal by providing information to the first wireless terminal about one or more of: a scheduling of the interfering signal and an identity of the second wireless terminal. The information is provided through an order related to said common control channel.

According to a second aspect of embodiments herein, the object is achieved by a network node structured to assist a first wireless terminal in cancelling an interfering signal from a received signal in a wireless communication network. The first wireless terminal is arranged to be located in a first coverage area of a first base station. The interfering signal originates from a second base station. Further, the interfering signal is intended for a second wireless terminal arranged to be located in a second coverage area of the second base station in the wireless communication network. The network node comprises a configuration manager structured to provide the first wireless terminal with a configuration information. The configuration information is related to the common control channel associated with the second base station, from which the interfering signal originates. The network node further comprises a scheduler structured to provide information to the first wireless terminal about one or more of: a scheduling of the interfering signal and an identity of the second wireless terminal. The information is provided through an order related to said common control channel.

According to a third aspect of embodiments herein, the object is achieved by a method in a first wireless terminal for cancelling an interfering signal from a received signal in a wireless communication network. The first wireless terminal is located in a first coverage area of a first base station. The interfering signal originates from a second base station and is intended for a second wireless terminal. The second wireless terminal is located in a second coverage area of the second base station in the wireless communication network. The first wireless terminal receives from a network node a configuration information. The configuration information is related to a common control channel associated with the second base station, from which the interfering signal originates. The first wireless terminal uses the received configuration information to receive information about one or more of: a scheduling of the interfering signal and an identity of the second wireless terminal, through an order related to said common control channel. The first wireless terminal uses the received configuration information and the information in the order related to said common control channel to cancel the interfering signal from the received signal.

According to a fourth aspect of embodiments herein, the object is achieved by a first wireless terminal structured to cancel an interfering signal from a received signal in a wireless communication network. The first wireless terminal is arranged to be located in a first coverage area of a first base station. The interfering signal originates from a second base station. The interfering signal is intended for a second wireless terminal arranged to be located in a second coverage area of the second base station in the wireless communication network. The first wireless terminal comprises a configuration manager structured to receive a configuration information related to a common control channel associated with the second base station, from which the interfering signal originates. The first wireless terminal further comprises an interference canceller structured to receive information about one or more of: a scheduling of the interfering signal and an identity of the second wireless terminal, through an order related to said common control channel. To receive the order related to said common control channel the interference canceller uses the received configuration information.

The interference canceller is further structured to cancel the interfering signal from the received signal, using the received configuration information and the received order.

Embodiments herein thus allows the first wireless terminal to reconstruct and cancel the interfering signal using the configuration information and the information about one or more of: the scheduling of the interfering signal and the identity of the second wireless terminal. Thereby, performance loss due to interference from the second base station is avoided.

One significant advantage of using the order related to said common control channel to convey information about one or more of: the scheduling of the interfering signal and the identity of the second wireless terminal in a wireless communication network is that the link throughput for wireless terminals may be significantly improved, e.g. in interference limited scenarios, such as when a signal to noise ratio of the first wireless terminal is reduced due to interference from the second base station.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed below.

Even though huge gains in terms of average sector throughput may be achieved with the introduction of LPNs, the interference structure becomes more complex in heterogeneous networks. For example, when a UE, such as a wireless terminal, is connected to an LPN, individual UE link throughput may be impacted due to the interference of the macro node power.

Figure 1A:
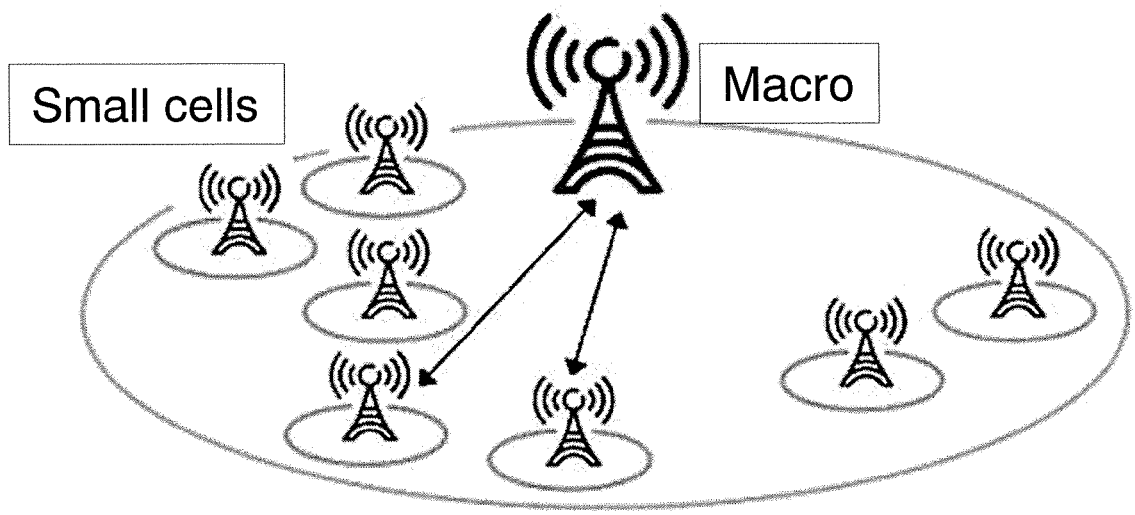
FIG. 1a is a schematic block diagram illustrating a typical heterogeneous network corresponding to prior art.
Figure 1B:
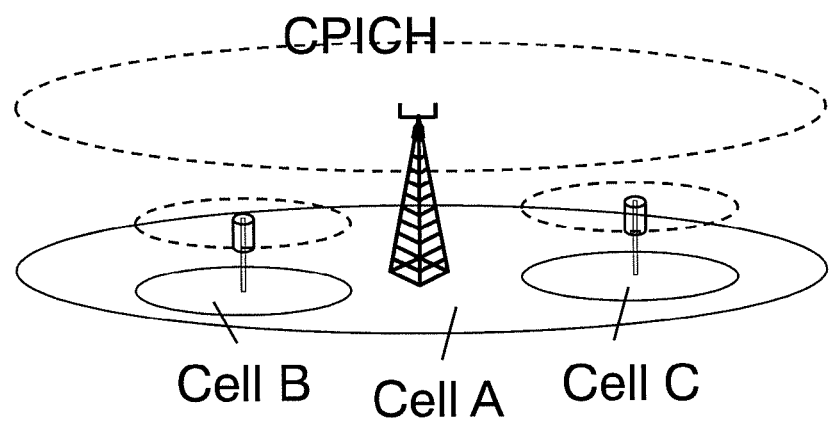
FIG. 1b is a schematic block diagram illustrating a heterogeneous network with co-channel deployment corresponding to prior art.
Figure 1C:
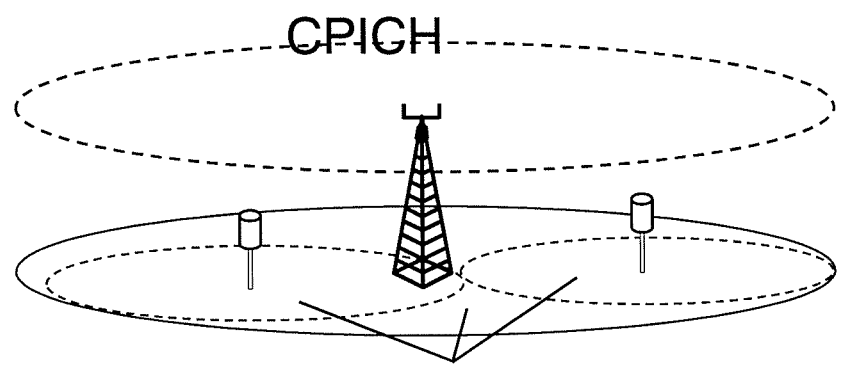
FIG. 1c is a schematic block diagram illustrating a heterogeneous network with combined cell deployment corresponding to prior art.
Figure 1D:
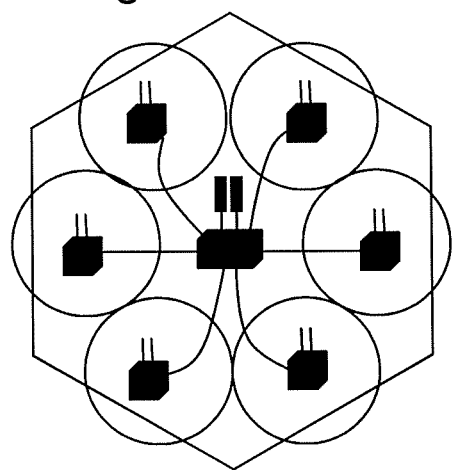
FIG. 1d is a schematic block diagram illustrating connection details of a heterogeneous network with co-channel deployment corresponding to prior art.
Figure 2:
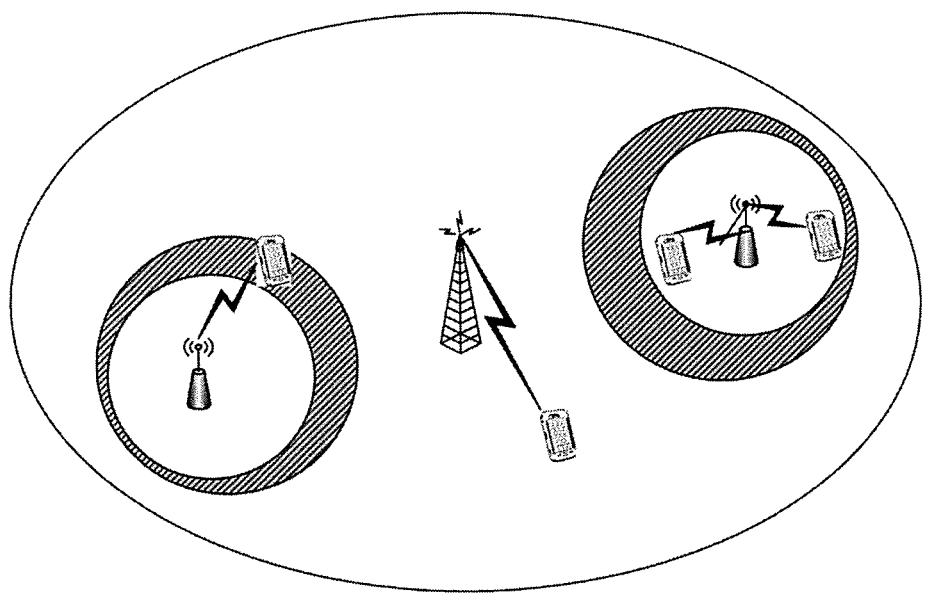
FIG. 2 is a schematic block diagram illustrating a heterogeneous network with cell range expansion zones.

FIG. 2 shows an example scenario where link performance of a UE may be impacted by a macro node. The scenario in the figure is applicable in both co-channel and combined cell deployments. Hence, the generic term "coverage area" will be used. In the figure, two LPN coverage areas served by two LPNs within a macro coverage area are illustrated. The grey portion of the LPN coverage area is a range expansion zone. The UEs in this zone which are connected to the LPN may be subjected to interferences from the macro node transmissions, since the received power from the macro node may be greater than the received power from the LPN in the range expansion zone.

Figure 3:
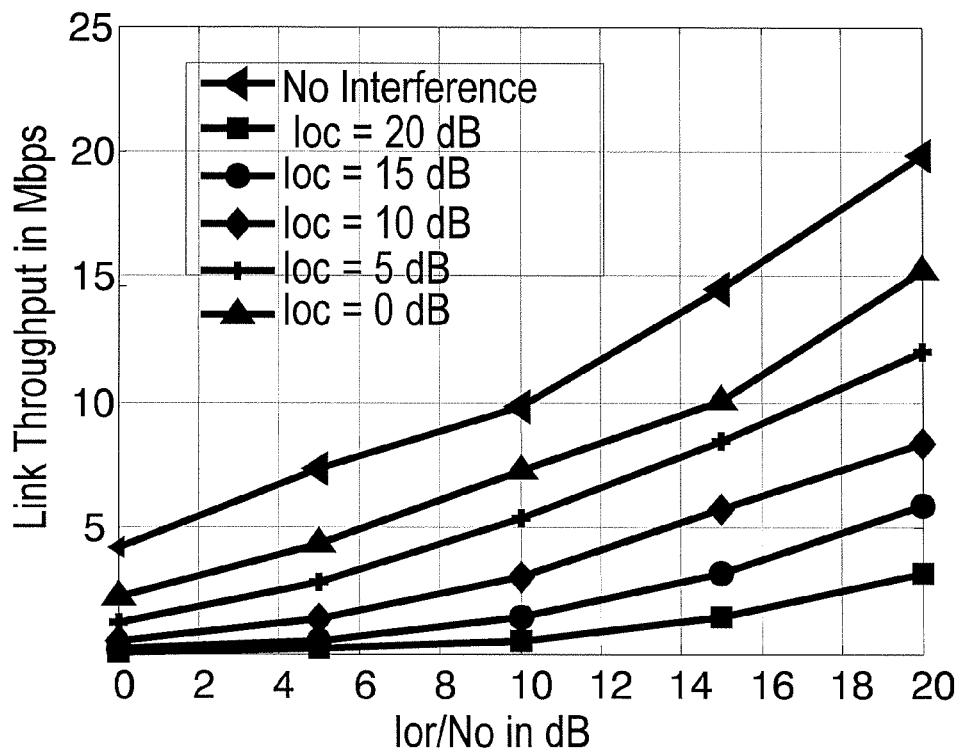
FIG. 3 is an example of a link performance graph illustrating performance degradation when a wireless terminal is in a cell range expansion zone corresponding to prior art.

FIG. 3 shows a graph of link performance when a UE, which is connected to an LPN, experiences a strong interference from the macro node. The vertical axis presents the link performance in terms of link throughput in Megabits per second (Mbps). The horizontal axis presents a measure of a signal to noise ratio in the UE. The Ior represents the desired signal power. The No represents the noise power excluding the interference power of the macro node. The interference due to other nodes than the macro is modeled as white noise in this figure. The relative power of the macro node is represented by Ioc, which is varied from 0 dB to 20 dB. Each relative power of the macro node is represented by a different marker. From FIG. 3, it is observed that there may be a huge performance degradation with the macro interference. The performance loss may be in a range of 100% at high geometries.

As indicated above, the presence of LPNs implies that the interference structure becomes more complex in heterogeneous networks. One way to reduce interferences is to cancel the interfering signals from the received signal so that what is left is the desired signal.

Figure 4:
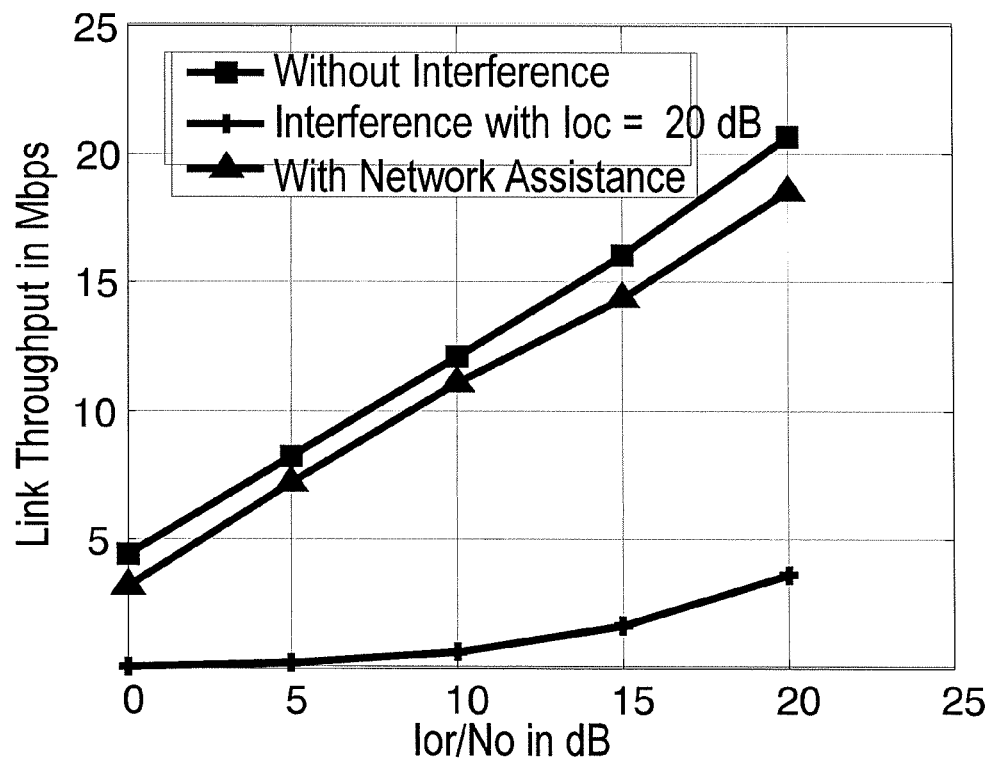
FIG. 4 is an example of a link performance graph illustrating performance degradation with and without network assistance.

FIG. 4 illustrates a link performance when a wireless communication network provides scheduling information of interferes to a UE. The vertical axis presents the link performance in terms of link throughput in Megabits per second (Mbps). The horizontal axis presents a measure of a signal to noise ratio in the UE. The Ior represents the desired signal power. The No represents the noise power excluding the interference power of the macro node. The interference due to other nodes than the macro is modeled as white noise in this figure. The relative power of the macro node is represented by Ioc, which is 20 dB in this figure. It is observed that significant performance gains can be achieved if the UE knows the information about the interfering signals, represented by triangles in this figure. The link throughput with network assistance is represented by rectangles. In the simulation, the interference signal was reconstructed at the UE receiver and the interference was removed from after the detector output.

FIG. 4 suggests that with assistance provided from the wireless communication network, the interference at the receiver, e.g. a UE, may be mitigated through interference cancellation, e.g. with a serial interference cancellation receiver. The wireless communication network assistance may be provided from the macro node and/or any one or more of the LPNs. As an example, the wireless communication network may provide the scheduling information of the interfering link.

A non-published internal reference implementation is to send a dedicated High Speed Shared Control Channel (HS-SCCH) order which conveys information about either the scheduling information of the interfering link or the identity of the UE which is scheduled on the interfering link. However, the macro node and the LPN requires to exchange the scheduling information on a dynamic basis when using the dedicated control channel order, i.e. every time whenever any UE is scheduled in any one of the nodes. However, this may not be possible in all scenarios, for example with limited backhaul support.

Embodiments herein are defined as a network node, a first wireless terminal and methods therein which may be put into practice in the embodiments described below. Further, terminologies from 3GPP are used below only to facilitate explanation and example application. Wireless systems such as WCDMA, WiMax, UMB, GSM, WiFi, and others may benefit from the technology described herein.

Figure 5:
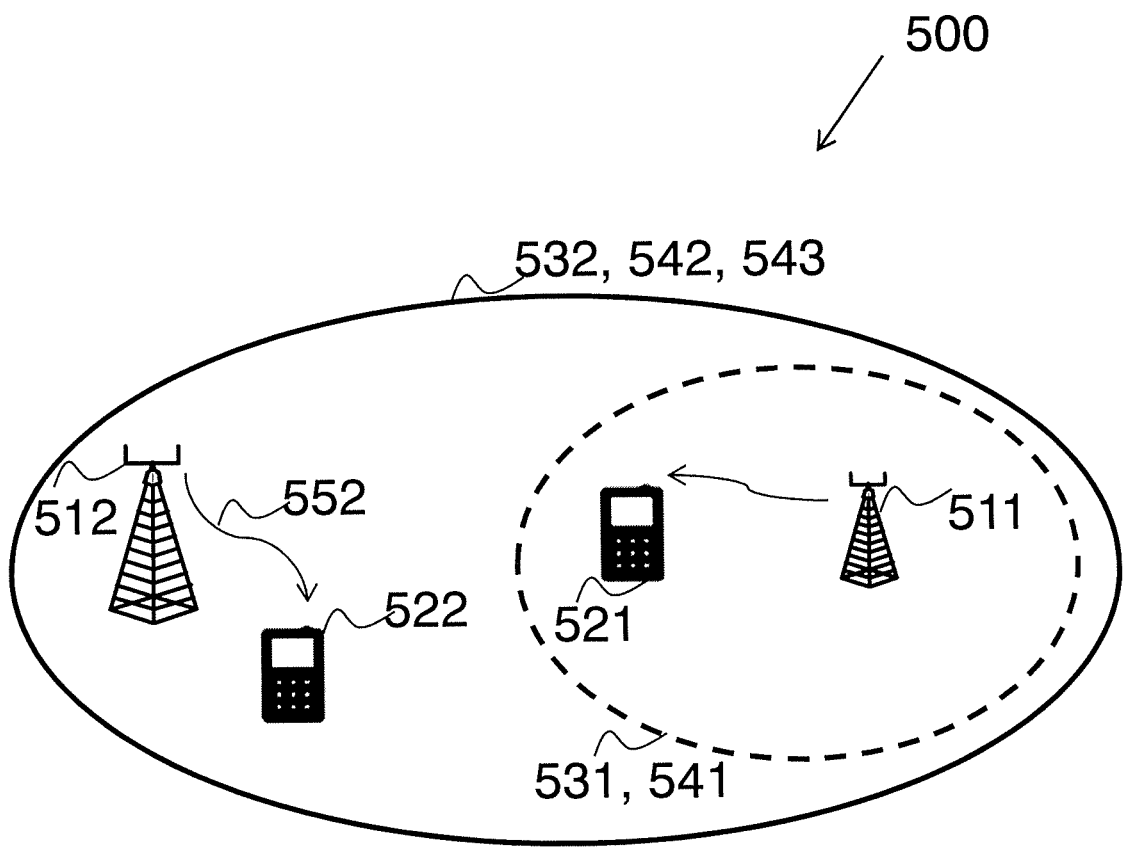
FIG. 5 is a schematic block diagram illustrating embodiments of a wireless communication network.

FIG. 5 depicts a wireless communications network 500 in which embodiments herein may be implemented. The wireless communications network 500 may be for example an LTE or any other 3GPP cellular network using common control channels. Further, the wireless communications network 500 may be a heterogeneous network. The wireless communications network 500 may further be implemented with co-channel deployment or with combined cell deployment.

The wireless communications network 500 comprises one or more network nodes 511, 512. The one or more network nodes 511, 512 may for example be a Core Network (CN) node or a Radio Network Controller (RNC) or a base station, such as a first base station 511 or a second base station 512, which are also comprised in the wireless communications network 500.

The first base station 511 and the second base station 512 may each be e.g. Radio Base Stations (RBS), which sometimes may be referred to as e.g. "eNodeB", "nodeB", or Base Transceiver Station (BTS). The base stations may be of different classes such as e.g. macro NodeBs, home NodeBs or Pico base stations. In this example, the second base station 512 may for example operate as a macro node having a higher transmission power than the first base station 511, which for example may operate as an LPN or a pico base station.

The wireless communications network 100 further comprises a first wireless terminal 521 and a second wireless terminal 522 respectively located in one of one or more first coverage area 531 of the first base station 511 and one or more second coverage area 532 of the second base station 512.

The first and second wireless terminals 521, 522 may be for example communication devices such as mobile telephones, cellular telephones, laptops or tablet computers, sometimes referred to as surf plates, with wireless capability. The wireless terminals may be portable, pocket-storable, hand-held, computer-comprised, or vehicle-mounted mobile devices.

The first wireless terminal 521 may be connected to the first base station 511 via radio communication. The second wireless terminal 522 may be connected to the second base station 512 via radio communication.

The first and the second coverage areas 531, 532 may be at least partly overlapping or adjacent to each other. In a co-channel deployment the first coverage area 531 may define a first cell 541 and the second coverage area 532 may define a second cell 542, which cells 541, 542 are different cells. In a combined cell deployment the first coverage area 531 and the second coverage area 532 may define a combined cell 543.

Naturally, there may be more base stations, coverage areas and cells in the wireless communications network 500, which base stations, coverage areas and cells are not shown in FIG. 5. As an example, the heterogeneous wireless communication network 500 may comprise one or more macro radio nodes, which may comprise the second base station 512. The heterogeneous wireless communication network 500 may further comprise one or more low power nodes, which may comprise the first base station 511. Each macro radio node may provide services within a respective coverage area, such as the one or more second coverage area 532, which may be e.g. a respective macro cell, such as the second cell 542. The respective macro cell corresponds to the respective macro radio node. The respective macro cell may be identifiable, e.g. by a cell identity. Each low power node may provide services within a respective coverage area, e.g. a respective low power coverage area, such as the one or more first coverage area 531, corresponding to the respective low power node. Each low power coverage area may be partially or completely overlapped by a corresponding macro cell.

Embodiments herein reduce the problem of performance loss due to interfering signals originating from other base stations than the connected base station 512.

According to embodiments herein, scheduling information may be conveyed to multiple UEs, e.g. to some or all UEs in a macro cell, without using dedicated High Speed Shared Control Channel (HS-SCCH) orders. Instead, it is proposed an order related to a common control channel be used to convey the necessary information. The order related to the common control channel may in this context be viewed as an order that can be listened to by multiple UEs, such as the first and second wireless terminals 521, 522. The order related to the common control channel will hereafter be referred to as a common control channel order.

An example of a non-published internal reference implementation of a common control channel order is a common HS-SCCH order, which allows a single HS-SCCH order to address multiple UEs, such as the first and second wireless terminals 521, 522. This provides avenues for sending control commands to many UEs without sending as many dedicated HS-SCCH orders. In the descriptions below, HS-SCCH orders will be used to facilitate explanation. However, the concepts are readily applicable to other common control channel orders.

To address these and other problems, one or more methods, apparatuses and/or systems are described herein in which one or more techniques to address interferences can be implemented. Some or all aspects of the disclosed subject matter may be applicable in a heterogeneous wireless communication network, such as the wireless communication network 500.

However, the methods don't limit the usage to the case where LPNs, such as the first base station 511, are deployed within a macro cell, such as the second cell 542. For example, the methods may be applied to a base station 511 and a wireless terminal 521, the wireless terminal 521 being connected to said base station 511, and which wireless terminal 521 receives interference from base stations which are not located in the same macro coverage area, such as the second coverage area 532. Interfering base stations which are not located in the same macro coverage area may for example be neighboring macro nodes or LPNs of a neighboring macro cell.

Figure 6:
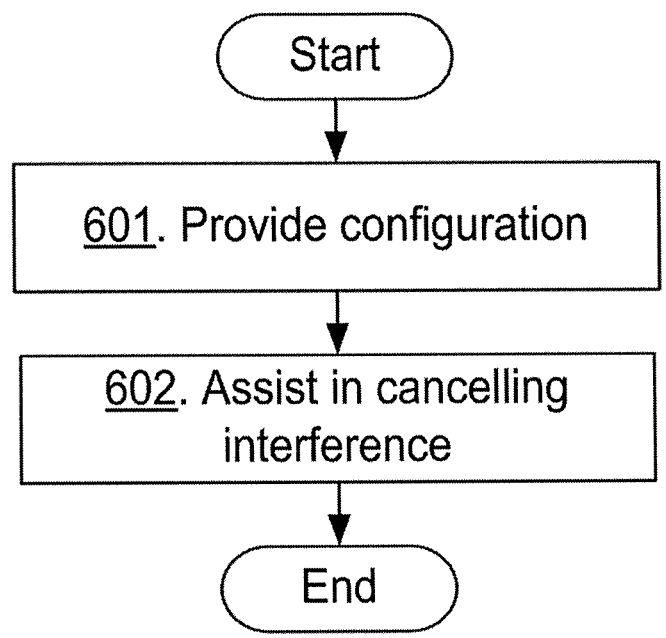
FIG. 6 is a schematic flowchart illustrating embodiments of a method in a network node.

Actions in the network node 511, 512 for assisting the first wireless terminal 521 in cancelling an interfering signal 552 originating from the second base station 512 and intended for the second wireless terminal 522 will now be described with reference to FIG. 6. As mentioned above the first wireless terminal 521 may be located in the first coverage area 531 of the first base station 511. The second wireless terminal 522 may be located in the second coverage area 532 of the second base station 512.

The actions do not have to be performed in the order stated below, but may be taken in any suitable order. Further, actions may be combined.

Action 601

A signal that the first wireless terminal 521 receives from the first base station 511 is interfered by the interfering signal 552 from the second base station 512. The performance loss due to said interference may be very high, for example if the first base station 511 is an LPN and the second base station 512 is a macro node. One way of mitigating said interference is to obtain information about the interfering signal 552, reconstruct the interfering signal 552 at the first wireless terminal 521 and subtract the interfering signal 552 from the received signal. In order for the network node 511, 512 to provide the first wireless terminal 521 with information about the interfering signal the network node 511, 512 may provide such information through a common control channel associated with the interfering second base station 512. By using a common control channel the information about the interfering signal 552 may be conveyed to multiple wireless terminals, e.g. a multiple of first wireless terminals 521. This provides avenues for sending control commands to many wireless terminals with only one information message. In order for the first wireless terminal to be able to receive the information about the interfering signal through a common control channel associated with the interfering second base station 512 the network node 511, 512 provides the first wireless terminal 521 with a configuration information related to a common control channel associated with the second base station 512.

In a co-channel deployment, where the first and second coverage areas 531, 532 correspond to two different cells, namely the first cell 541 and the second cell 542, the configuration information may be provided via the second base station 512.

In a combined cell deployment, where the first and second coverage areas 531, 532 correspond to the same combined cell 543, the configuration information may be provided via the first base station 512, since the configuration information is the same for all the coverage areas comprised in the macro coverage area.

The configuration information may comprise a common identifier of wireless terminals, which common identifier is associated with the second coverage area 562.

By using a common identifier associated with the second coverage area 532 the network node 511, 512 may send the same information about the interfering signal 552 to several wireless terminals comprising, e.g. the first wireless terminal 521. By using the provided configuration information the first wireless terminal 521 is able to monitor the common control channels of the second base station 512 for information about the interfering signal 552.

In some embodiments the common identifier is a common H-Radio Network Temporary Identifier (H—RNTI).

In some embodiments the configuration information may be provided at the time of cell setup for the first wireless terminal 521.

The configuration information may also comprise a second common identifier of wireless terminals, which second common identifier is associated with the first coverage area 561. This could for example be the case when a co-channel deployment is used.

The configuration information may be provided through higher layer signaling, such as Radio Resource Control (RRC) signaling.

In some embodiments corresponding to a co-channel deployment the common identifier and the second common identifier is different, i.e. different common control channel orders are used for the first and the second base stations 511, 512.

In some embodiments corresponding to the co-channel deployment the first cell 541 is the macro cell and the second coverage area 532 comprises a multiple of second coverage areas 532 comprised in the first cell 541. Then the common identifier comprises a multiple of common identifiers associated with the multiple of second coverage areas 532.

In some further embodiments corresponding to the co-channel deployment the first cell 541 is an LPN cell and the common identifier comprises at least the common identifier associated with the macro cell, e.g. the second cell 542.

Action 602

The network node 511, 512 assists the first wireless terminal 521 in cancelling the interfering signal 552 by providing information to the first wireless terminal 521 about one or more of: a scheduling of the interfering signal 552 and an identity of the second wireless terminal 522. The information is provided through a common control channel order associated with the second base station 512.

When a co-channel deployment is used the common control channel order may be provided via the second base station 512. In a combined cell deployment the common control channel order may be common of both the first and the second base stations 511, 512. Then the common control channel order may be provided via the first base station 511.

The common control channel order may be a High-Speed Shared Control Channel (HS-SCCH) order.

The network node 511, 512 may assist the first wireless terminal 521 in cancelling the interfering signal 552 by providing the information when the first wireless terminal 521 is scheduled.

Further, the common control channel order, e.g. the common HS-SCCH order, may be scrambled with a cell-specific downlink scrambling code in the same way as in existing 3GPP specifications. This implies that common control channel orders, e.g. HS-SCCH orders, from a particular cell, e.g. the second cell 542, will only affect the wireless terminals that are monitoring the common control channels, i.e. the common control channel channelization codes, in that particular cell, e.g. the second cell 542. In existing 3GPP specifications, the wireless terminals, e.g. the first wireless terminal 521, may monitor a number of common control channels, e.g. a number of HS-SCCHs, in the serving cell, e.g. the first cell 541, which may be a High Speed Downlink Shared Channel (HS-DSCH) cell. The first wireless terminal 521 may further monitor a number of common control channels in any activated secondary serving cells, which may be HS-DSCH cells, and up to one common control channel, e.g. a High Speed Shared Control Channel (HS-SCCH), in a non-serving cell for triggering of enhanced serving cell change.

For orders dedicated for a specific wireless terminal, e.g. the wireless terminal 521, the order is acknowledged by the specific wireless terminal with an ACKnowledge (ACK) codeword in the Hybrid Automatic Repeat reQuest (HARQ)-ACK field on the High-Speed Dedicated Physical Common Control Channel (HS-DPCCH). The specific wireless terminal never sends a Negative ACKnowledge (NACK) in response to a common control channel order, e.g. an HS-SCCH order. If the specific wireless terminal does not ACK the order, the base station, e.g. the network node 512, can choose to retransmit the order, possibly with a higher transmit power, until an ACK is received from the specific wireless terminal or until a maximum number of retransmissions have been reached.

In the case of common control channel orders, e.g. common HS-SCCH orders, for interference cancellation, the first wireless terminal 121 may not need to send an ACK/NAK. This is because the ACK/NAK information needs to be sent dynamically since there is a delay involved with sending ACK/NAK before the order is applied.

Hence ACK/NACK feedback from the wireless terminal is not necessary for the common HS-SCCH orders to work. There may be a number of reasons for not requiring the wireless terminal to send ACK/NAK in response to common control channel orders, e.g. HS-SCCH orders, for providing information related to interference cancellation. Said reasons comprise:

Since there is a delay involved with sending ACK/NAK and receiving potential retransmissions of the HS-SCCH order, the retransmitted order might not arrive in time to be useful in the interference cancellation process. Information needs to be sent dynamically and taken into account in the interference cancellation process without too much delay.

The base station, e.g. the first or second base station 511, 512, that transmits the HS-SCCH order conveying the interference cancellation related information may not even be aware of the identity of the wireless terminal 521 that tries to receive and use the information. In this instance, the wireless terminal 521 would not be able to send an ACK/NAK since there would not be an established feedback channel in the uplink to the base station sending the order;

In circumstances where the downlink channel quality from the base station sending the order is significantly stronger than the uplink channel quality to the same base station for the particular wireless terminal, e.g. the wireless terminal 521, it may be challenging or resource consuming to transmit ACK/NAK in the uplink.

Hence, the common control channel order need not require any ACK/NAK feedback from the first wireless terminal 521.

The common control channel order, e.g. the common HS-SCCH order, may include any combination of: a scheduling of the interfering signal 552 and an identity of the second wireless terminal 522.

The common control channel order may include an indication that it is an order for informing the scheduling information from a specific node, such as the second base station 522. The indication may be provided in one or more indication bits. The indication may include modulation, Transport Block (TB) size information, and spreading codes used for scheduling. The indication may also carry precoding and rank information, e.g. if the interferer, such as the second wireless terminal 522, is scheduled with MIMO transmission.

Being provided with the identity of the second wireless terminal 522 the first wireless terminal 521 may decode its dedicated common control channel, e.g. its dedicated HS-SCCH, and can get the scheduling information.

Once the interfering signal 552 intended for the second wireless terminal 522 is reconstructed, the interfering signal 552 may be subtracted from the received signal, thereby reducing the interference caused by the interfering signal 552.

Figure 7A:
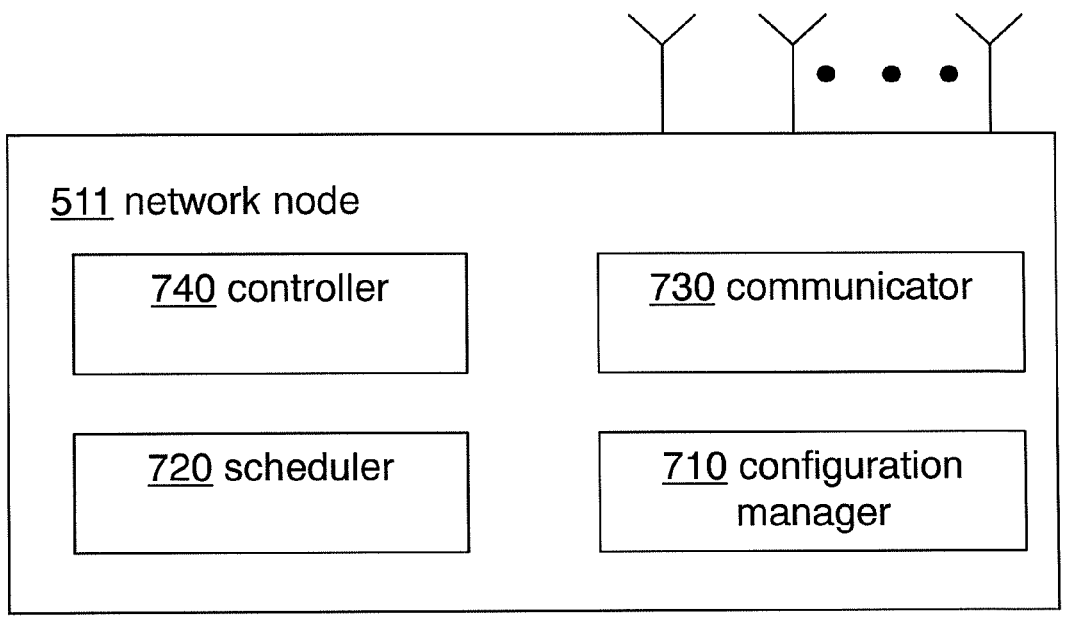
FIGS. 7a and 7b are schematic block diagrams illustrating embodiments of a network node.

To perform the method actions for assisting the first wireless terminal 521 in cancelling an interfering signal 552 from a received signal in a wireless communication network 500 described above in relation to FIG. 6, the network node 511, 512 comprises the following arrangement depicted in FIG. 7a. The network node 511, 512 may be a CN node, a RNC, or even a base station, e.g. a macro node. These are merely examples of network nodes and should be not taken in a limiting sense.

As mentioned above, the first wireless terminal 521 is arranged to be located in the first coverage area 531 of the first base station 111 and the second wireless terminal 521 is arranged to be located in the second coverage area 532 of the second base station 112. The first base station 511 and the first wireless terminal 521 are arranged to communicate with each other, while the second base station 112 and the second wireless terminal 522 are arranged to communicate with each other. The first wireless terminal 521 is further arranged to receive a signal from the first base station 511. The second base station 512 is arranged to send an interfering signal 552 to the second wireless terminal 522. The interfering signal 522 interferes the received signal at the first wireless terminal 521.

The first coverage area 531 may be arranged to at least partly overlap with the second coverage area 562.

In some embodiments the first base station 511 is structured to operate as an LPN and the second base station 512 is structured to operate as a macro node.

The network node 511, 512 comprises a configuration manager 710. The configuration manager 710 may be structured to acquire, update and otherwise manage configuration information related to one or more common control channels of one or more nodes in a macro cell.

For example, the configuration manager 710 is structured to provide the first wireless terminal 521 with a configuration information related to the common control channel associated with the second base station 512 from which the interfering signal 552 originates.

Further, the configuration information may include the common identifier of wireless terminals, e.g. the common H-RNTIs of one or more nodes, such as macro node, e.g. the second base station 512, and LPN, e.g. the first base station 511, of the macro cell.

In some embodiments the configuration information comprises the common identifier of wireless terminals, which common identifier is associated with the second coverage area 562.

The configuration manager may be structured to provide the configuration information to the first wireless terminal 521, e.g. upon cell setup.

The network node 511, 512 further comprises a scheduler 720

The scheduler 720 may be structured to transmit one or more common control channel orders such as common HS-SCCH orders to the first wireless terminal 521. Each common control channel order may be cell specific, e.g. LPN cell or macro cell. Of course, the scheduler may also be structured to transmit one or more dedicated control channel orders, e.g. UE specific.

The scheduler 720 is structured to provide information to the first wireless terminal 521 about one or more out of: a scheduling of the interfering signal 552 and an identity of the second wireless terminal 522, which information is provided through a common control channel order associated with the second base station 512.

In some embodiments the scheduler further is structured to provide information to the first wireless terminal 521 about one or more out of: a scheduling of the interfering signal 552 and an identity of the second wireless terminal 522, when the first wireless terminal 521 is scheduled.

The network node 511, 512 may further comprise a communicator 730. The communicator 730 may be structured to communicate, wired and/or wirelessly, with other network nodes. The communicator 730 may also be structured to communicate with wireless terminals, e.g., UEs, such as the first and second wireless terminal 521, 522. In one embodiment, the network node 511, 512 may be a radio node, e.g. an eNodeB, and the communicator 730 may be structured to perform radio communications with the first and second wireless terminals 521, 522. In another embodiment, the communicator 730 may be structured such that the network node 511, 512, e.g. an RNC, communicates with the first and second wireless terminals 521, 522 over higher layers via a radio node, such as the first and second base station 511, 512.

The network node 511, 512 may further comprise a controller 740 which may be structured to collect information, e.g. regarding the signal to noise ratio quality with respect to the first base station 511 and to the second base station 512, from each of the first and second wireless terminals 521, 522. The controller 740 may further be structured to decide which base station 511, 512 shall transmit to which wireless terminal 521, 522 during a specific transmission time interval.

FIG. 7a provides a logical view of the network node 511, 512 and the components comprised therein. It is not strictly necessary that each component be implemented as physically separate modules. Some or all components may be combined in a physical module.

Figure 7B:
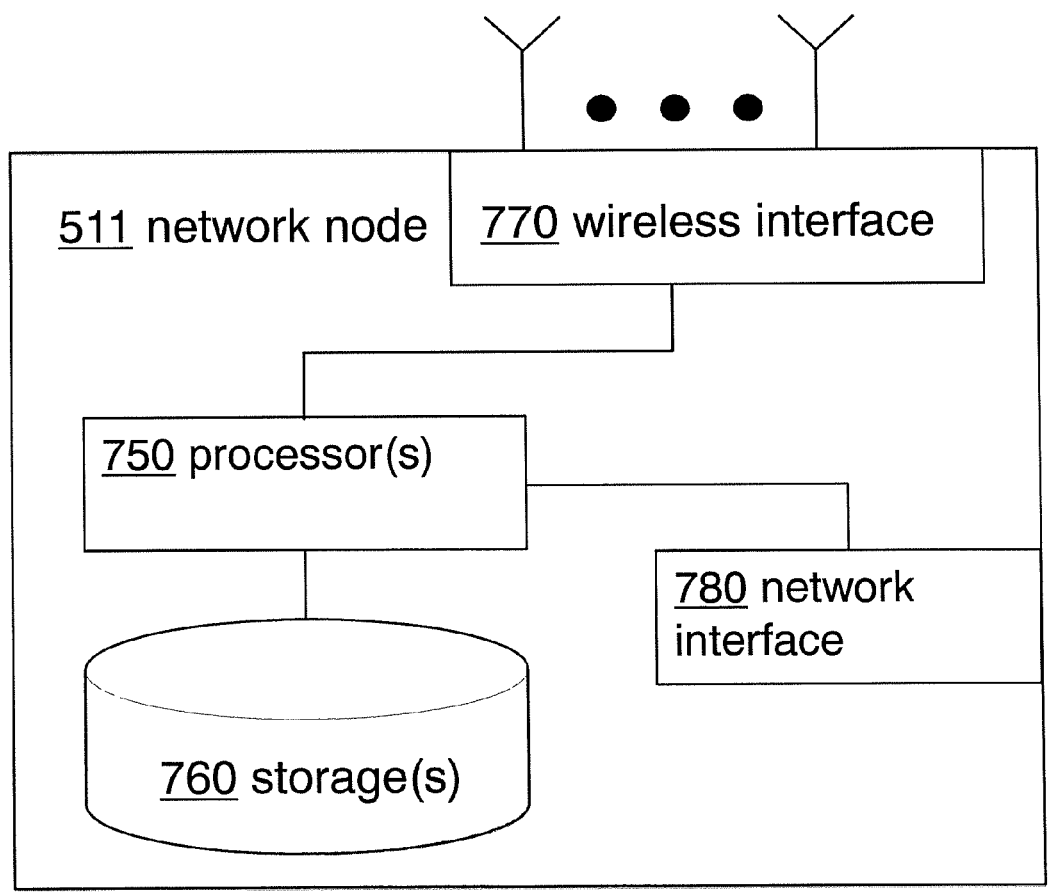

Also, the components of the network node 511, 512 need not be implemented strictly in hardware. It is envisioned that the components may be implemented through any combination of hardware and software. For example, as illustrated in FIG. 7b, the network node 511, 512 may include one or more hardware processors 750, one or more storages 760, such as internal and external or both, and one or both of a wireless interface 770, e.g. in case of a macro radio node, and a network interface 780.

The one or more processors 750 may be structured to execute program instructions to perform the functions of one or more of the network node 511, 512 components. The instructions may be stored in a non-transitory storage medium or in firmware, e.g. ROM, RAM and Flash, denoted as storage(s) 760 in FIG. 7b. Note that the program instructions may also be received through wired and/or or wireless transitory medium via one or both of the wireless and network interfaces 780, 790. The wireless interface 780, e.g. a transceiver, may be structured to receive signals from and send signals to the first wireless terminal 521 via one or more antennas. The network interface 780 may be structured to communicate with other network nodes.

The one or more storages 760 may be arranged to store information obtained from for example the first wireless terminal 521, the second wireless terminal 522, the first base station 511 and the second base station 512. Such information may be information about for example a channel quality indicator, or the signal to noise ratio, etc. The one or more storages 760 may also store configurations and applications to perform the methods herein when being executed in the network node 511, 512.

One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Actions described above will be described below in more detail from a perspective of the first wireless terminal 521.

Figure 8:
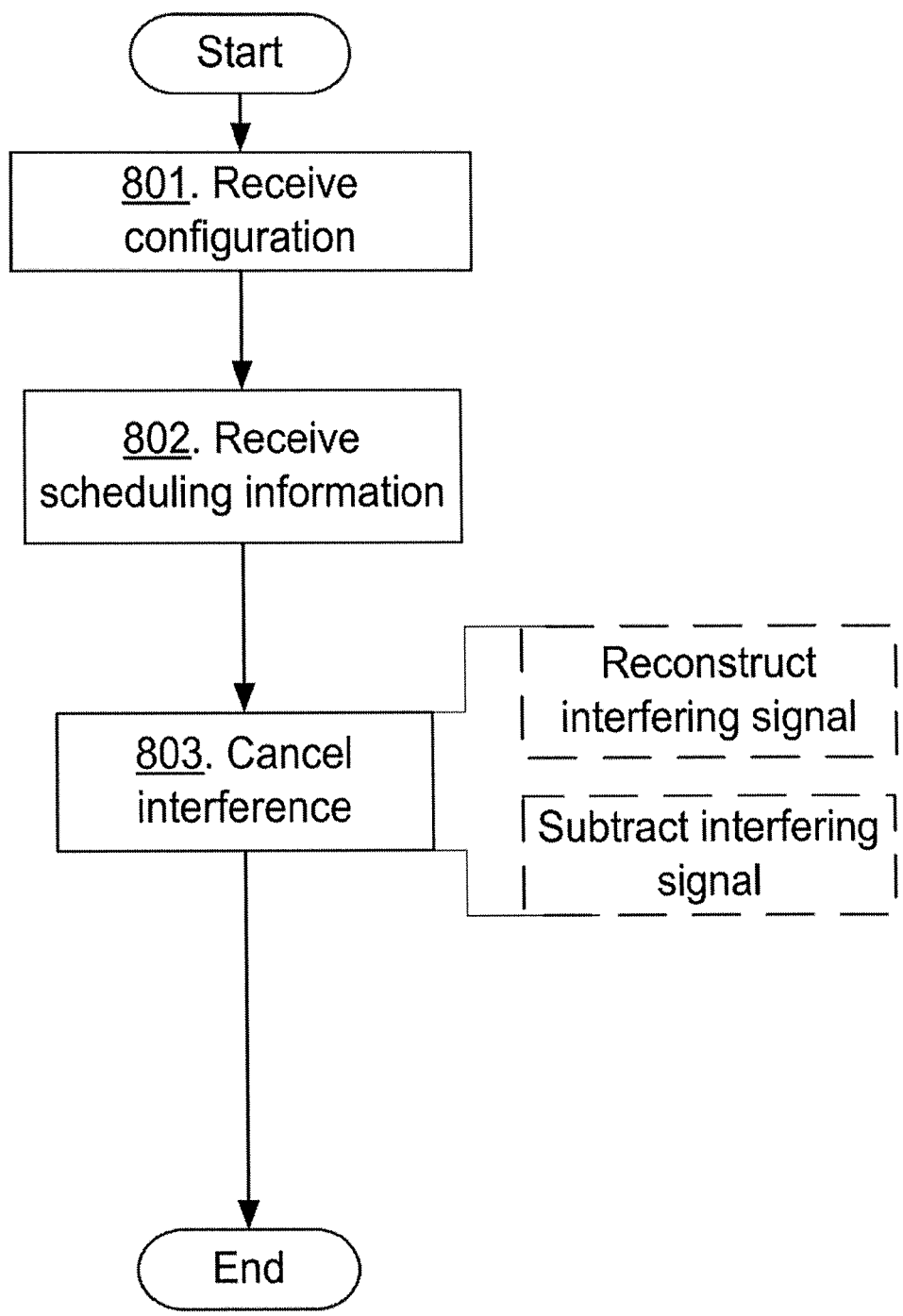
FIG. 8 is a flowchart depicting embodiments of a method in a base station.

Examples of embodiments of a method in the first wireless terminal 521 for cancelling an interfering signal 552 from a received signal will now be described with reference to the flowchart depicted in FIG. 8. As mentioned above, the first wireless terminal 521 is located in a first coverage area 531 of a first base station 511. The interfering signal 552 originates from a second base station 512 and is intended for a second wireless terminal 522 located in a second coverage area 562 of the second base station 512.

In some embodiments the first coverage area 531 at least partly overlaps with the second coverage area 562.

The first base station 511 may operate as a low power node and the second base station 512 may operate as a macro node.

The method comprises the following actions, which actions may be taken in any suitable order. Dashed lines of some boxes in FIG. 8 indicate that this action is not mandatory.

Action 801

The first wireless terminal 521 receives from the network node 511, 512, a configuration information related to a common control channel associated with the second base station 512, from which the interfering signal 552 originates. Using the received configuration information the first wireless terminal 521 is able to receive information about the interfering signal in action 802 below.

The configuration information may comprise an identifier of wireless terminals, which common identifier is associated with the second coverage area 562.

In some embodiments the common identifier is the common H-RNTI.

Further, the configuration information may be received at cell setup.

Action 802

The first wireless terminal 521 may monitor the common control channel orders, e.g. HS-SCCH orders, of the second base station 512 to be able to cancel the interference from the second base station 512.

The first wireless terminal 521 receives information about one or more out of: a scheduling of the interfering signal 552 and an identity of the second wireless terminal 522. The information is received through a common control channel order associated with the second base station 512. The information is received by using the received configuration information.

In some embodiments the common control channel order is received when the first wireless terminal 521 is scheduled.

In the combined cell deployment, the interference will most likely be mainly from nodes in the same combined cell 543. In this instance the first wireless terminal 521 may monitor only the common control channel order associated with the first coverage area 532, since the common control channel order associated with the first coverage area 531 is the same as for the second coverage area 532.

Action 803

The first wireless terminal 521 cancels the interfering signal 552 from the received signal, using the received configuration information and the common control channel order.

In some embodiments the cancelling of the interfering signal 552 is performed by a serial interference cancellation receiver.

In some embodiments the first wireless terminal 521 reconstructs the interfering signal 552 based on the information received through the common control channel, and subtracts the reconstructed interfering signal 552 from the received signal in order to cancel the interfering signal 552.

Figure 9A:
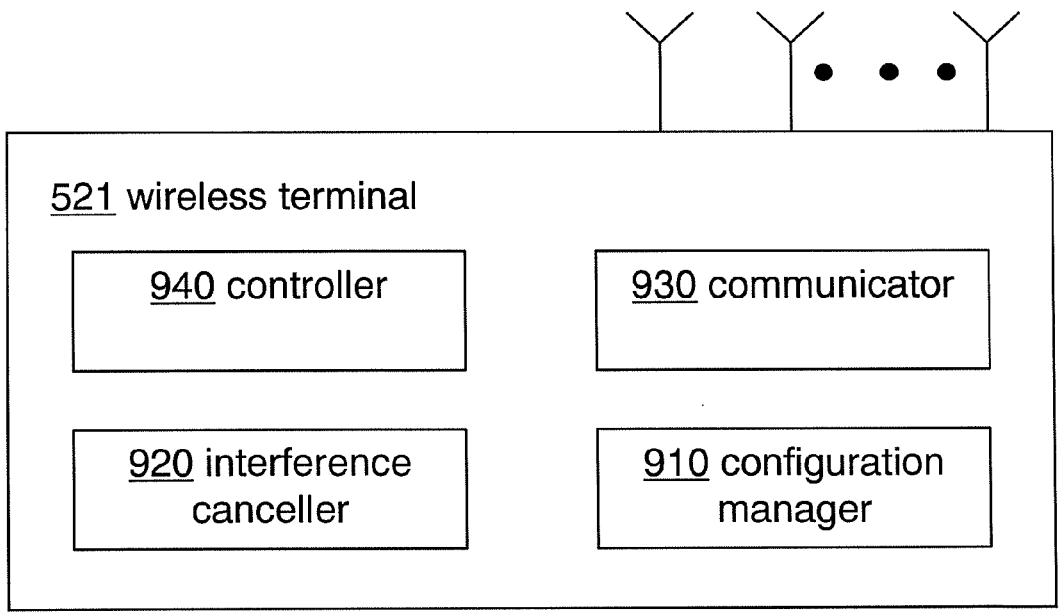
FIGS. 9a and 9b are schematic block diagrams illustrating embodiments of a first base station.

To perform the method actions for cancelling an interfering signal 552 from a received signal in a wireless communication network 500, described above in relation to FIG. 8, the first wireless terminal 521 comprises the following arrangement depicted in FIG. 9a.

As mentioned above, the first wireless terminal 521 is arranged to be located in the first coverage area 531 of the first base station 111 and the second wireless terminal 521 is arranged to be located in the second coverage area 532 of the second base station 112. The first base station 511 and the first wireless terminal 521 are arranged to communicate with each other, while the second base station 112 and the second wireless terminal 522 are arranged to communicate with each other. The first wireless terminal 521 is further arranged to receive a signal from the first base station 511. The second base station 512 is arranged to send an interfering signal 552 to the second wireless terminal 522. The interfering signal 522 interferes the received signal at the first wireless terminal 521.

The first coverage area 531 may be arranged to at least partly overlap with the second coverage area 562.

In some embodiments the first base station 511 is structured to operate as a Low Power Node, LPN, and the second base station 512 is structured to operate as a macro node.

The first wireless terminal 521 comprises a configuration manager 910. The configuration manager 910 may be structured to receive and manage configuration information related to one or more common control channels of one or more nodes in heterogeneous network.

The configuration manager 910 is structured to receive a configuration information related to a common control channel associated with the second base station 512, from which the interfering signal 552 originates.

In some embodiments the configuration information comprises a common identifier of wireless terminals associated with the second coverage area 562.

The common identifier of wireless terminals may be the common H—RNTI.

For example, the configuration manager 910 may receive the configuration information upon cell setup.

The first wireless terminal 521 further comprises an interference canceller 920 structured to receive information about one or more out of: a scheduling of the interfering signal 552 and an identity of the second wireless terminal 522, through a common control channel order associated with the second base station 512, using the received configuration information. The interference canceller 920 is further structured to cancel the interfering signal 552 from the received signal, using the received information about one or more out of: the scheduling of the interfering signal 552 and the identity of the second wireless terminal 522.

In some embodiments the interference canceller 920 is structured to receive the interfering signal 552.

The common control channel order may for example be a HS-SCCH order.

In some embodiments the common control channel order is received when the first wireless terminal 521 is scheduled.

The interference canceller 920 may further be structured to reconstruct the interfering signal 552 based on the information received through the common control channel order, and subtract the reconstructed interfering signal 552 from the received signal.

In some embodiments the interference canceller 920 further comprises a serial interference cancellation receiver structured to cancel the interfering signal 552.

In some embodiments the first wireless terminal 521 comprises a communicator 930. The communicator 930 may be structured to communicate wirelessly with other radio nodes, such as base stations. For example, the configuration manager 910 may receive the configuration information, via the communicator 930.

The communicator 930 may also be structured to perform wired communications, e.g. via a universal serial bus, with other nodes.

The first wireless terminal 521 may further comprise a controller 940.

FIG. 9a provides a logical view of the first wireless terminal 521 and the components included therein. It is not strictly necessary that each component be implemented as physically separate modules. Some or all components may be combined in a physical module.

Figure 9B:
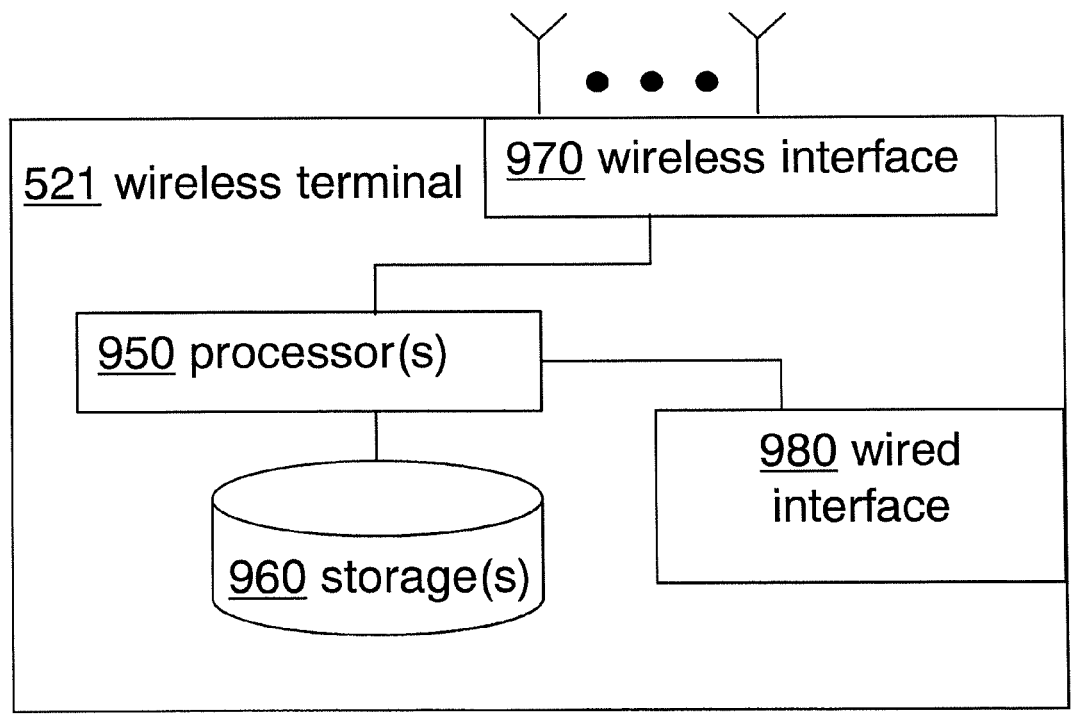

Also, the components of the first wireless terminal 521 need not be implemented strictly in hardware. It is envisioned that the components may be implemented through any combination of hardware and software. For example, as illustrated in FIG. 9b, the wireless terminal 521 may include one or more hardware processors 950, one or more storages 960, such as internal and external or both, and one or both of a wireless interface 970 and a wired interface 980.

The one or more processors 950 may be structured to execute program instructions to perform the functions of one or more of the components of the first wireless terminal 521. The instructions may be stored in a non-transitory storage medium or in firmware, e.g. ROM, RAM and Flash, denoted as storage(s) 960 in FIG. 9b. Note that the program instructions may also be received through wired and/or or wireless transitory medium via one or both of the wireless and wired interfaces 970, 980. The wireless interface 970, e.g. a transceiver, may be structured to receive signals from and send signals to the first wireless terminal 521 via one or more antennas. The wired interface 980 may be included and structured to communicate with other nodes.

The one or more storages 960 is arranged to store information obtained from for example the network node 511, 512, the first base station 511 and the second base station 512. Such information may be information about e.g. the channel quality indicator or the signal to noise ratio, etc. The one or more storages 760 may also store configurations and applications to perform the methods herein when being executed in the network node 511, 512.

One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Further Details of Interference Cancellation Exemplified with Co-channel Deployment Embodiments herein will now be described in more detail, applicable to any suitable embodiments above. Examples of embodiments herein are described assuming that the wireless communication network 500 is a heterogeneous network with a co-channel deployment. The heterogeneous wireless communication network 500 is further assumed to comprise a macro node, e.g. the second base station 512, with a related macro coverage area, such as the second coverage area 532. The heterogeneous wireless communication network 500 is further assumed to comprise one or more LPNs, e.g. the first base station 111, associated with one or more coverage areas, such as the first coverage area 531. In the heterogeneous wireless communication network 500 it is further assumed that the first coverage area 531 and the second coverage area 532 are comprised in the macro cell. Further, in a co-channel deployment each coverage area corresponds to a separate cell. For example, the first coverage area 531 corresponds to the first cell 541 and the second coverage area 532 corresponds to the second cell 542. Further, in the co-channel deployment the macro cell, and the cells of the LPNs, i.e. all the cells comprised in the macro cell, may be treated as neighbor cells, i.e. as having separate cell identities. Therefore, the first cell 541 and the second cell 542 are treated as neighbor cells in this embodiment.

Also, each network node, e.g. the first and the second base stations 511, 512, may respectively be associated with at least one respective common control channel order, e.g. at least one respective common HS-SCCH order.

Further, the common control channel order, e.g. the common HS-SCCH order, associated with each node in the macro coverage area, e.g. the second coverage area 532, may be different from the common control channel orders, e.g. the common HS-SCCH orders, associated with some or all other base stations of the same macro coverage area. As an example, the common control channel order associated with the first base station 511 may be different than the common control channel order associated with the second base station 512.

Figure 10:
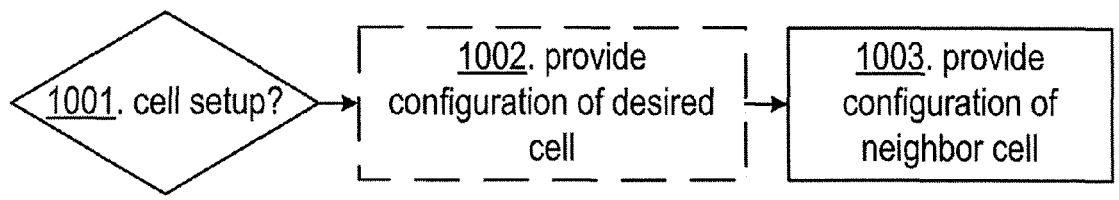
FIG. 10-11 are schematic block diagrams illustrating further embodiments of a method in a network node.

The network node 511, 512 may inform the first wireless terminal 121 of the configurations of the common control channel orders, e.g. the common HS-SCCH orders, associated with the nodes of the macro coverage area, such as the first and second base stations 511, 512. The configuration information may be provided through higher layer signaling, e.g. RRC signaling. FIG. 10 is an example flow chart of a method in the network node 511, 512 to provide 1002, 1003 the wireless terminal 121 with the configuration information related to the common control channels of the first and second cells 541, 542. For example, at the time of cell setup 1001, the network node 511, 512 may provide 1002, 1003 configuration information including a common identifier of wireless terminals. The common identifier may e.g. be a common H-RNTI of the first cell 541, which may be referred to as the desired cell. The network node 511, 512 may also configures a list of common identifiers, e.g. a list of H-RNTIs, of the neighboring cells, such as the second cell 542.

For ease of reference and brevity, the common H-RNTI of the desired cell will be referred to as the desired H-RNTI and the H-RNTIs in the list of H-RNTIs of the neighboring cells will be referred to as the neighbor H-RNTIs. The desired and the neighbor H-RNTIs may comprise any combination of the following characteristics:

- The desired H-RNTI may be different from some or all of the neighbor H-RNTIs, which means that there may be different common control channel orders for each macro and LPN network node;
- When the desired cell, such as the first cell 541, is the macro cell, the neighbor H-RNTIs comprise H-RNTIs of all LPNs, such as the second base station 512, in the macro cell;
- When the desired cell, such as the first cell 541, is a LPN cell, the neighbor H-RNTIs comprise at least the H-RNTI of the macro cell, such as the second cell 542, since some LPNs may not be interfered by every other LPN within the same macro cell.

Figure 11:
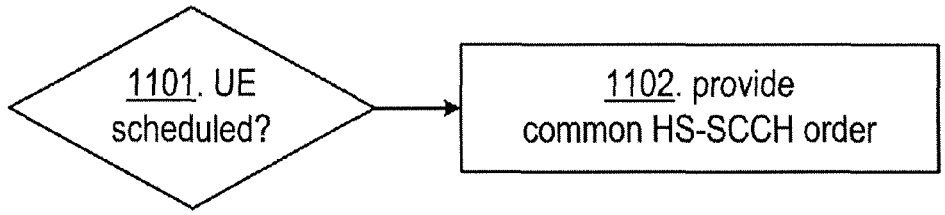

FIG. 11 is an example flow chart of method in a network node 511, 512 to notify the first wireless terminal 521 of the interfering signal 552. Whenever any wireless terminal, such as the first and second wireless terminal 521, 522, is scheduled 1101, the nodes, such as the first and second base stations 511, 512, may transmit 1102 the common control channel orders, e.g. the common HS-SCCH orders, to aid the first wireless terminal 521 in cancelling the interference from the second base station 512. In FIG. 11, each macro and LPN node may transmit its own common control order, such as its own common HS-SCCH order.

Figure 12:
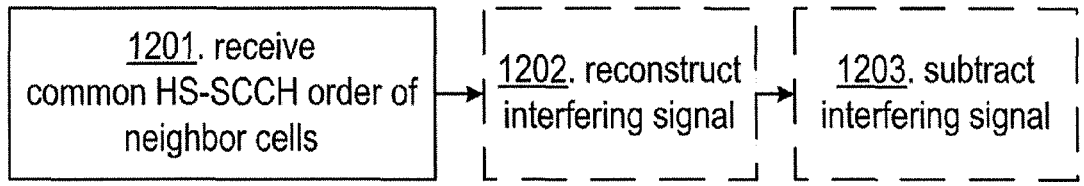
FIG. 12 is schematic block diagram illustrating further embodiments of a method in a wireless terminal.

The first wireless terminal 521 may monitor the common control channel orders, e.g. the common HS-SCCH orders, of the neighbor cells, e.g. the second cell 542 to thereby cancel the interferences from other nodes, such as the second base station 512. FIG. 12 is an example flow chart of a method in the first wireless terminal 521 to cancel interferences in co-channel deployment. First, the first wireless terminal 521 receives 1201 the common control channel orders of neighbor cells.

Further, as illustrated in FIG. 12, the interfering signals, i.e. signals intended for other wireless terminals, such as the second wireless terminal 522, may be reconstructed 1202 based on for example the scheduling information carried on the common control channel orders, e.g. the HS-SCCH orders of neighbor cells, such as the second cell 542. Once the first wireless terminal has reconstructed 1202 the interfering signals the first wireless terminal may subtract 1203 the interfering signals.

Note that wireless terminals, such as the first wireless terminal 521, near the edge of the macro cell, e.g. the second cell 542, may be subject to interferences from nodes that are not part of the macro cell—e.g. from a neighboring macro node or LPNs of the neighboring macro cell. In one embodiment, the common identifiers associated with the neighbor cells, e.g. the neighbor H-RNTIs, such as the common identifier associated with the second cell 542, e.g., provided through the method of FIG. 11, may include the common identifier of such neighboring nodes which are not part of the macro cell. Whether or not such common identifiers, e.g. such H-RNTIs, will be provided may depend on one or more considerations. Example considerations may include the location of the first wireless terminal 521 at setup, e.g. the first wireless terminal's GPS location, the network node connected to at setup, e.g. an LPN located near the cell edge of the macro cell, etc.

Further Details of Interference Cancellation Exemplified with Combined Cell Deployment Embodiments herein will now be described in more detail, applicable to any suitable embodiments above. Embodiments herein are described assuming that the wireless communication network 500 is a heterogeneous network with a combined cell deployment. As mentioned above in relation to the co-channel deployment, the heterogeneous wireless communication network 500 is assumed to comprise a macro node with a related macro coverage area and one or more LPNs with associated one or more LPN coverage areas. However, in the combined cell deployment all the coverage areas within the macro coverage area constitute a combined cell, such as the combined cell 543. Thus, the first coverage area 531 and the second coverage area 532 belong to the same cell 543 in the combined deployment. The second base station 512 may be the macro base station and the first base station 511 may be one of the one or more LPNs comprised in the combined cell.

Interference cancellation in the combined cell deployment is simpler relative to the co-channel deployment. Since all nodes, such as macro and LPN, in the macro coverage area belong to the same cell, each node may send the common control channel order, e.g. the HS-SCCH order, whenever any wireless terminal, such as the first wireless terminal 521, in the combined cell is scheduled.

Figure 13:
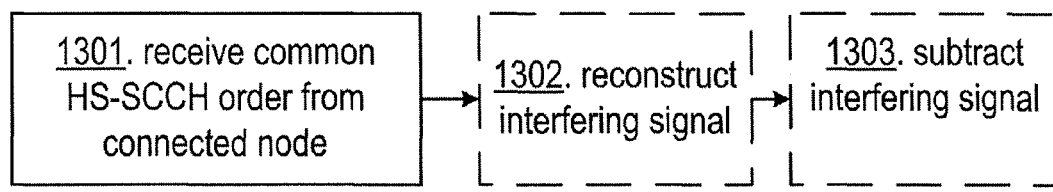
FIG. 13 is a schematic block diagram illustrating further embodiments of a method in a network node.

In the combined cell deployment, the interference will most likely be mainly from other nodes in the same combined cell. In this instance, there will be no need for the first wireless terminal 521 to monitor the common control channel order, e.g. the HS-SCCH order, from the coverage areas other than the first coverage area 531, i.e. from the first base station 511, of the macro cell. For example, there is no need for the first wireless terminal 521 to monitor the common control channel order from the second coverage area 532. As illustrated in FIG. 13, the interfering signal may be reconstructed 1302 and subtracted 1303 based on the scheduling information carried on the common control channel order, such as the HS-SCCH order, received 1301 from the connected node, e.g. the first base station 511.

Even in the combined cell deployment, the wireless terminals, such as the first wireless terminal 521, near the macro cell's edge, e.g. the edge of the second cell 542, may be subject to interferences from nodes of other macro cells. In one embodiment, such nodes may be viewed as a the neighbor nodes with a different common control channel order, such as an HS-SCCH order, and may be accommodated in manners similar to the methods illustrated in FIGS. 10-12.

Another aspect of the disclosed subject matter may be directed to program instructions which when executed by a computer of a network node, causes the network node to perform the method as described above. The program instructions may be received through a transitory medium and executed directly therefrom. The program instructions may also be stored in a non-transitory storage medium and the network node may read the program instructions therefrom.

Another aspect of the disclosed subject matter may be directed to program instructions which when executed by a computer of a wireless terminal, causes the wireless terminal to perform the method as described above. The program instructions may be received through a transitory medium and executed directly therefrom. The program instructions may also be stored in a non-transitory storage medium and the network node may read the program instructions therefrom.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for assisting a first wireless terminal in cancelling an interfering signal from a received signal in a wireless communication network, which the first wireless terminal is located in a first coverage area of a first base station, and which the interfering signal originates from a second base station and is intended for a second wireless terminal located in a second coverage area of the second base station in the wireless communication network, the method comprising:
   providing the first wireless terminal with a configuration information related to a common control channel associated with the second base station from which the interfering signal originates, and
   assisting the first wireless terminal in cancelling the interfering signal by providing information to the first wireless terminal about one or more of: a scheduling of the interfering signal and an identity of the second wireless terminal, which information is provided through an order related to said common control channel.

2. The method according to claim 1, wherein the order related to said common control channel is a High-Speed Shared Control Channel, HS-SCCH, order.

3. The method according to claim 1, wherein the first coverage area at least partly overlaps with the second coverage area.

4. The method according to claim 1, wherein the configuration information comprises a common identifier of wireless terminals, which common identifier is associated with the second coverage area.

5. The method according to claim 4, wherein the common identifier of the one or more second wireless terminals is a common High speed downlink shared channel Radio Network Temporary Identifier, H-RNTI.

6. The method according to claim 1, wherein the first base station operates as a Low Power Node, LPN, and the second base station operates as a macro node.

7. The method according to claim 1, wherein the assisting the first wireless terminal in cancelling the interfering signal is performed when the first wireless terminal is scheduled.

8. A network node configured to assist a first wireless terminal in cancelling an interfering signal from a received signal in a wireless communication network, which the first wireless terminal is arranged to be located in a first coverage area of a first base station and which the interfering signal originates from a second base station and is intended for a second wireless terminal arranged to be located in a second coverage area of the second base station in the wireless communication network, the network node comprising:
   a configuration manager configured to provide the first wireless terminal with a configuration information related to the common control channel associated with the second base station from which the interfering signal originates, and
   a scheduler configured to provide information to the first wireless terminal about one or more of: a scheduling of the interfering signal and an identity of the second wireless terminal, which information is provided through an order related to said common control channel.

9. The network node according to claim 8, wherein the order related to said common control channel is a High-Speed Shared Control Channel, HS-SCCH, order.

10. The network node according to claim 8, wherein the first coverage area is arranged to at least partly overlap with the second coverage area.

11. The network node according to claim 8, wherein the configuration information comprises a common identifier of wireless terminals, which common identifier is associated with the second coverage area.

12. The network node according to claim 11, wherein the common identifier is a common High speed downlink shared channel Radio Network Temporary Identifier, H-RNTI.

13. The network node according to claim 8, wherein the first base station is configured to operate as a Low Power Node, LPN, and the second base station is configured to operate as a macro node.

14. The network node according to claim 8, wherein the scheduler further is configured to provide information to the first wireless terminal about one or more of: a scheduling of the interfering signal and an identity of the second wireless terminal, when the first wireless terminal is scheduled.

15. A method in a first wireless terminal for cancelling an interfering signal from a received signal in a wireless communication network, which the first wireless terminal is located in a first coverage area of a first base station and which the interfering signal originates from a second base station and is intended for a second wireless terminal located in a second coverage area of the second base station in the wireless communication network, the method comprising:
   receiving from a network node a configuration information related to a common control channel associated with the second base station, from which the interfering signal originates;
   receiving information about one or more of: a scheduling of the interfering signal and an identity of the second wireless terminal, through an order related to said common control channel, using the received configuration information; and
   cancelling the interfering signal from the received signal, using the received configuration information and the information about one or more of: the scheduling of the interfering signal and the identity of the second wireless terminal.

16. The method according to claim 15, wherein the order related to said common control channel is a High-Speed Shared Control Channel (HS-SCCH) order.

17. The method according to claim 15, wherein the first coverage area at least partly overlaps with the second coverage area.

18. The method according to claim 15, wherein the configuration information comprises an identifier of wireless terminals, which common identifier is associated with the second coverage area.

19. The method according to claim 18, wherein the common identifier is a common High speed downlink shared channel Radio Network Temporary Identifier, H-RNTI.

20. The method according to claim 15, wherein the first base station operates as a Low Power Node, LPN, and the second base station operates as a macro node.

21. The method according to claim 15, wherein the configuration information is received at cell setup.

22. The method according to claim 15, wherein the information about one or more of: a scheduling of the interfering signal and an identity of the second wireless terminal is received when the first wireless terminal is scheduled.

23. The method according to claim 15, wherein the cancelling comprises:
reconstructing the interfering signal based on the information received through the order related to said common control channel, and
subtracting the reconstructed interfering signal from the received signal.

24. The method according to claim 15, wherein the cancelling of the interfering signal is performed by a serial interference cancellation receiver.

25. A first wireless terminal configured to cancel an interfering signal from a received signal in a wireless communication network, which the first wireless terminal is arranged to be located in a first coverage area of a first base station and which the interfering signal originates from a second base station and is intended for a second wireless terminal arranged to be located in a second coverage area of the second base station in the wireless communication network, the first wireless terminal comprising:
a configuration manager configured to receive a configuration information related to a common control channel associated with the second base station, from which the interfering signal originates, and
an interference canceller configured to receive information about one or more of: a scheduling of the interfering signal and an identity of the second wireless terminal, through an order related to said common control channel, using the received configuration information, and further configured to cancel the interfering signal from the received signal, using the received configuration information and the information about one or more of: the scheduling of the interfering signal and the identity of the second wireless terminal.

26. The first wireless terminal according to claim 25, wherein the order related to said common control channel is a High-Speed Shared Control Channel, HS-SCCH, order.

27. The first wireless terminal according to claim 25, wherein the first coverage area is arranged to at least partly overlap with the second coverage area.

28. The first wireless terminal according to claim 25, wherein the configuration information comprises a common identifier of wireless terminals associated with the second coverage area.

29. The first wireless terminal according to claim 28, wherein the common identifier is a common High speed downlink shared channel Radio Network Temporary Identifier, H-RNTI.

30. The first wireless terminal according to claim 25, wherein the configuration information is received at cell setup.

31. The first wireless terminal according to claim 25, wherein the first base station is configured to operate as a Low Power Node, LPN, and the second base station is configured to operate as a macro node.

32. The first wireless terminal according to claim 25, wherein the information about one or more of: a scheduling of the interfering signal and an identity of the second wireless terminal is received when the first wireless terminal is scheduled.

33. The first wireless terminal according to claim 25, wherein the interference canceller is further configured to:
reconstruct the interfering signal based on the information received through the order related to said common control channel, and
subtract the reconstructed interfering signal from the received signal.

34. The first wireless terminal according to claim 25, wherein the interference canceller further comprises a serial interference cancellation receiver configured to cancel the interfering signal.

* * * * *